(12) United States Patent  (10) Patent No.: US 9,105,211 B2
Keh et al.                (45) Date of Patent:    Aug. 11, 2015

(54) PORTABLE PROJECTOR AND IMAGE PROJECTING METHOD THEREOF

(71) Applicant: Samsung Electronics Co., Ltd., Gyeonggi-do (KR)

(72) Inventors: Yong-Chan Keh, Seoul (KR); Sung-Won Kim, Gyeonggi-do (KR); Dong-Hi Lee, Gyeonggi-do (KR); Jung-Kee Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 140 days.

(21) Appl. No.: 13/800,473

(22) Filed: Mar. 13, 2013

(65) Prior Publication Data

US 2013/0241820 A1    Sep. 19, 2013

(30) Foreign Application Priority Data

Mar. 13, 2012  (KR) .......................... 10-2012-0025613
Apr. 2, 2012   (KR) .......................... 10-2012-0034077

(51) Int. Cl.
*G09G 5/00*    (2006.01)
*G03B 21/28*   (2006.01)
*G06F 3/14*    (2006.01)
*G06F 3/042*   (2006.01)
*H04N 9/31*    (2006.01)
*G09G 3/00*    (2006.01)

(52) U.S. Cl.
CPC .............. *G09G 5/003* (2013.01); *G06F 3/0426* (2013.01); *G06F 3/1454* (2013.01); *G09G 3/002* (2013.01); *H04N 9/3173* (2013.01); *H04N 9/3179* (2013.01); *H04N 9/3194* (2013.01); *G03B 21/28* (2013.01); *G09G 2370/16* (2013.01)

(58) Field of Classification Search
None
See application file for complete search history.

(56) References Cited

U.S. PATENT DOCUMENTS

| | | | | |
|---|---|---|---|---|
| 5,484,966 | A * | 1/1996 | Segen ....................... | 178/18.09 |
| 5,777,605 | A * | 7/1998 | Yoshinobu et al. .......... | 345/173 |
| 6,061,051 | A * | 5/2000 | Chan et al. .................. | 345/173 |
| 6,498,602 | B1 * | 12/2002 | Ogawa ......................... | 345/173 |
| 6,654,007 | B2 * | 11/2003 | Ito ............................... | 345/175 |
| 6,999,061 | B2 * | 2/2006 | Hara et al. .................... | 345/157 |
| 7,185,987 | B2 * | 3/2007 | Tamura ......................... | 353/42 |
| 8,123,361 | B2 * | 2/2012 | Nagashima et al. .......... | 353/30 |
| 2002/0097910 | A1 * | 7/2002 | Guha ........................... | 382/187 |
| 2004/0257347 | A1 * | 12/2004 | Noji ............................. | 345/179 |
| 2005/0083301 | A1 * | 4/2005 | Tamura ......................... | 345/158 |
| 2005/0243070 | A1 * | 11/2005 | Ung et al. ..................... | 345/176 |
| 2006/0158435 | A1 * | 7/2006 | Lin et al. ...................... | 345/168 |
| 2007/0046654 | A1 * | 3/2007 | Tomiya ......................... | 345/179 |
| 2009/0044989 | A1 * | 2/2009 | Sato .............................. | 178/18.01 |
| 2009/0128716 | A1 * | 5/2009 | Nagashima et al. .......... | 348/756 |
| 2009/0315847 | A1 * | 12/2009 | Fujii .............................. | 345/173 |
| 2010/0097345 | A1 * | 4/2010 | Jang et al. ..................... | 345/174 |

(Continued)

*Primary Examiner* — Peter Vincent Agustin
(74) *Attorney, Agent, or Firm* — The Farrell Law Firm, P.C.

(57) ABSTRACT

A portable projector includes a projector module for projecting image data, an infrared ray output unit which outputs an infrared ray to a projected image data area, a camera unit which photographs the projected image data area, a coordinate value calculator which calculates a coordinate value corresponding to each coordinate value of the photographed projected image data area, and a controller which determines whether there is a pen or a finger input in the projected image data area according to the calculated coordinate value and performing a control for updating the image data by using an input coordinate value corresponding to the input when there is input by the one of the pen and the finger.

12 Claims, 6 Drawing Sheets

(56) References Cited

U.S. PATENT DOCUMENTS

2012/0212440 A1* 8/2012 Nishida et al. ............... 345/173
2012/0299856 A1* 11/2012 Hasui ............................ 345/173
2013/0147711 A1* 6/2013 Njolstad et al. ............... 345/158
2013/0241820 A1* 9/2013 Keh et al. ...................... 345/156
2013/0307803 A1* 11/2013 Koga et al. .................... 345/173

* cited by examiner

PORTABLE PROJECTOR AND IMAGE PROJECTING METHOD THEREOF

PRIORITY

This application claims priority under 35 U.S.C. §119(a) to Korean Application Serial Nos. 10-2012-0025613 and 10-2012-0034077, which were filed in the Korean Intellectual Property Office on March 13 and Apr. 2, 2012, the contents of which are incorporated herein by reference.

BACKGROUND OF THE INVENTION

1. Field of the Invention

The present invention relates generally to a projector, and more particularly, to a portable projector and an image projecting method of a portable projector.

2. Description of the Related Art

Various portable devices which can communicate and process personal information while in motion, such as a mobile phone, a smart phone, a Personal Digital Assistant (PDA) and an electronic scheduler have been released during the rapid development of digital technologies.

The portable devices output screen data desired to be primarily displayed on a display provided on the portable device, which usually has a small size for portability purposes.

Accordingly, a user alone can see information displayed on the display device, but has difficulty sharing the information with a plurality of users. Therefore, various attempts have been made to provide a portable device having a projector function of outputting an image of the portable device to the outside and allowing a plurality of users to view the image together through a large screen.

The portable device having the projector function refers to a portable terminal capable of projecting screen data of the portable device onto a surface such as a wall or a floor as an external screen, thus allowing a plurality of users to simultaneously view the projected screen data.

The portable device having the conventional projector function performs an input function of obtaining input data by placing an object such as a hand or a pen close to an image screen projected onto a projection area as well as the image projection function corresponding to an inherent function of the current projector.

However, the portable device having the conventional projector function is inconvenient and lacks versatility because it can only obtain the input data by using one of, but not both of, the hand and the pen.

In addition, the portable device having the conventional projector function has limited implementation since a projection angle of the screen data is controlled using a separate complex mechanical component for controlling the projection angle on the wall or the floor.

SUMMARY OF THE INVENTION

Accordingly, an aspect of the present invention is to provide a portable projector capable of discriminating between a pen input and a finger input and simultaneously supporting the pen and the finger input, and an image projecting method of the portable projector.

Another aspect of the present invention is to provide a portable projector capable of allowing a simple projection onto a floor through a reflecting method using a mirror, and an image projecting method of the portable projector.

In accordance with as aspect of the present invention, a portable projector includes a projector module for projecting image data, an infrared ray output unit which outputs an infrared ray to a projected image data area, a camera unit which photographs the projected image data area, a coordinate value calculator which calculates a coordinate value corresponding to each coordinate value of the photographed projected image data area, and a controller which determines whether there is a pen or a finger input in the projected image data area according to the calculated coordinate value and performing a control for updating the image data by using an input coordinate value corresponding to the input when there is the input by the one of the pen and the finger.

In accordance with another aspect of the present invention, a method of projecting image data by a portable projector includes projecting image data and outputting an infrared ray to a projected image data area, photographing the projected image data area, calculating a coordinate value corresponding to each coordinate value of the photographed projected image data area, determining whether there is a pen or a finger input in the projected image data area according to the calculated coordinate value, and updating the image data by using an input coordinate value when the input is determined.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described with reference to the accompanying drawings. In the following description, the same elements will be designated by the same reference numerals although they are shown in different drawings. Various specific definitions found in the following description are provided only to help general understanding of the present invention, and it is apparent to those skilled in the art that the present invention can be implemented without such definitions. Further, a detailed description of known functions and configurations incorporated herein will be omitted for the sake of clarity and conciseness.

The portable projector according to an embodiment of the present invention calculates each pixel value of the projected image data photographed by the infrared ray camera, when there is a pixel that is greater than a (predetermined) first threshold, determines a coordinate value of the corresponding pixel as a pen input coordinate value, and when there is a pixel that is less than or equal to the first threshold and greater than a (predetermined) second threshold, determines the coordinate value of the corresponding pixel as a finger input coordinate value. The portable projector according to an embodiment of the present invention projects image data updated according to the input coordinate value.

The portable projector may receive image data from an external terminal such as a smart phone, a video player, or a mobile phone, and project the received image data. Alternatively, the portable device may be integrally implemented with a device such as a smart phone, a video player, a mobile phone, or a Digital Multimedia Broadcasting (DMB) receiver, and project pre-stored image data.

Figure 1:
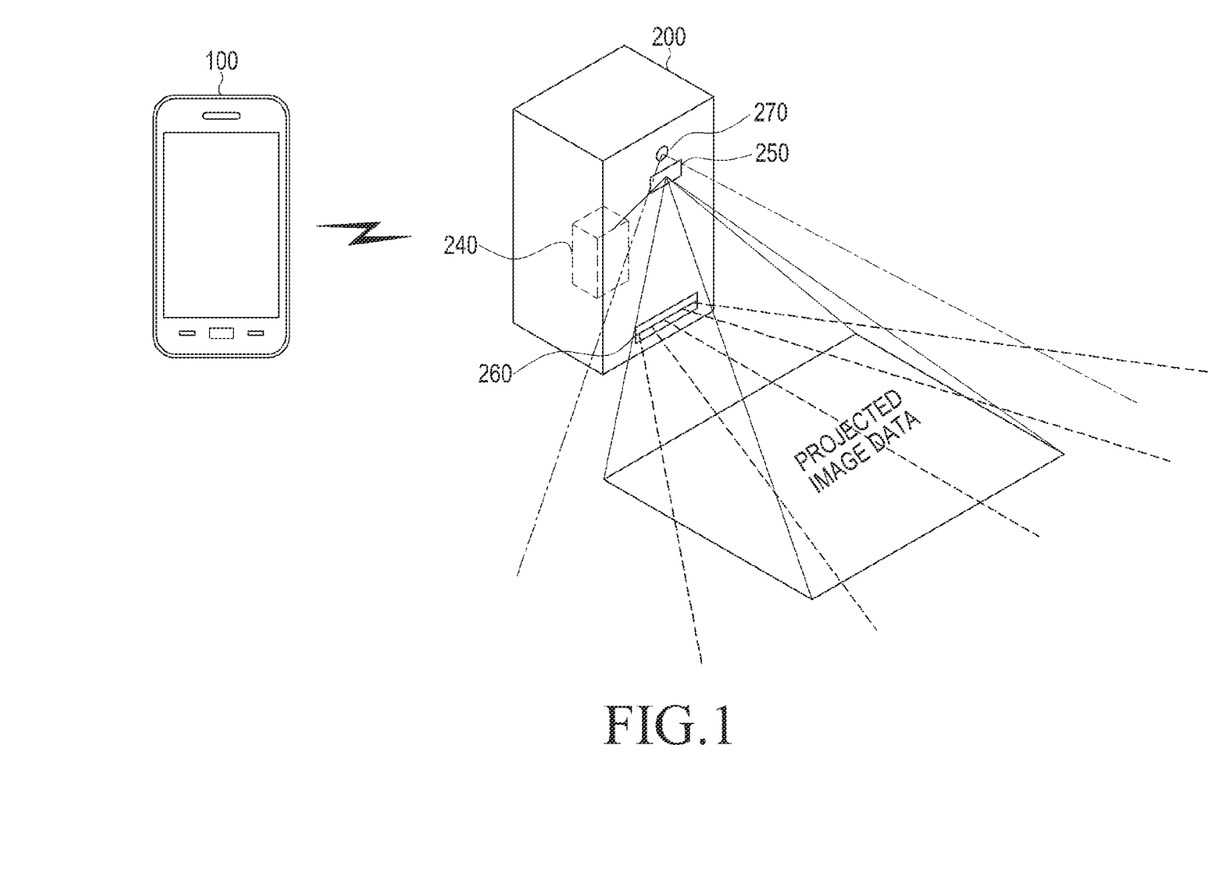
FIG. 1 illustrates a portable projector according to an embodiment of the present invention.

FIG. 1 illustrates an external terminal and a portable projector according to an embodiment of the present invention. Referring to FIG. 1, an external terminal 100 transmits image data to a portable projector 200. When the external terminal 100 receives an input coordinate value and an image data update request signal from the portable projector 200, the external terminal 100 updates the image data by using the input coordinate value and provides the updated image data to the portable projector 200.

The portable projector 200 receives image data from the external terminal 100 such as a smart phone, a video player, or a mobile phone. The portable projector 200 outputs the received image data through a projector module 240, reflects the output image data through a mirror unit 250 to project the image data onto a floor, and outputs an infrared ray flat light parallel to a floor surface through an infrared ray output unit 260.

The portable projector 200 photographs the image data projected onto the floor by using a camera unit 270, analyzes the photographed image data to determine whether there is a pen or a finger input, and then determines an input coordinate value. The portable projector 200 transmits the determined input coordinate value and an image data update request signal to the external terminal 100.

Figure 2:
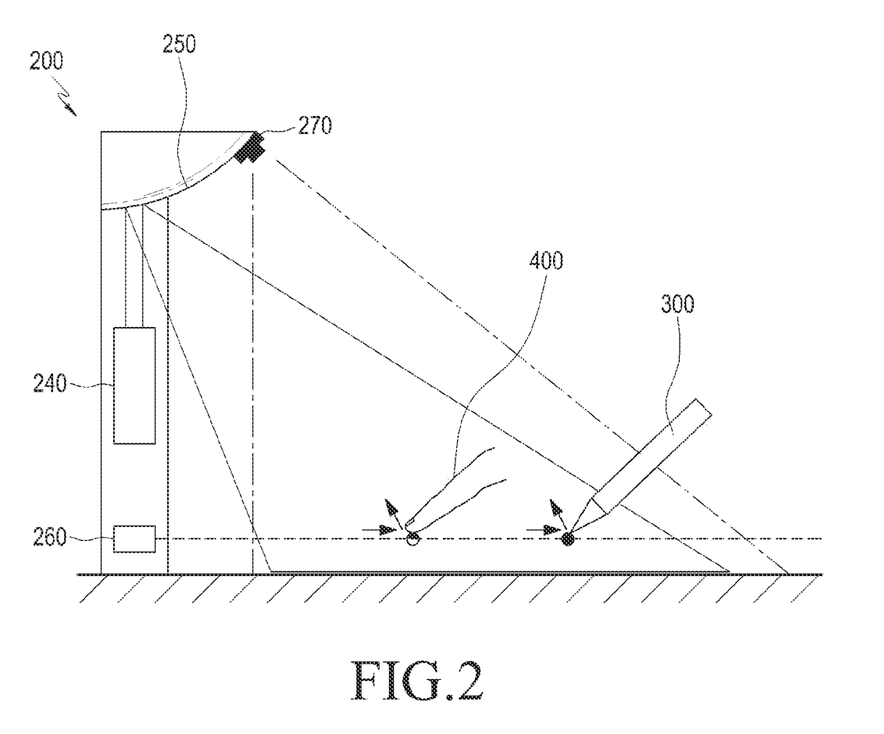
FIG. 2 illustrates projecting an image onto a floor by a portable projector according to an embodiment of the present invention.

FIG. 2 illustrates in detail the portable projector 200 according to an embodiment of the present invention. Referring to FIG. 2, the portable projector 200 projects image data onto a floor through the projector module 240 and the mirror unit 250, outputs the infrared ray flat light parallel to the floor surface through the infrared ray output unit 260, photographs the image data projected onto the floor through the camera unit 270, and then determines whether there is an input by one of a pen 300 and a finger 400.

When an image data area projected onto the floor is touched by the finger 400, the infrared ray flat light is reflected by the finger 400, and the reflected light may be incident to the camera unit 270, and a coordinate value corresponding to a position touched by the finger may be greater than or equal to the second threshold due to the incidence of the reflected light, in the image data photographed by the camera unit 270.

When the image data area projected onto the floor is touched by the pen 300, an infrared ray emitter installed in the pen 300 is turned on and thus emits light, and the emitted light from the infrared ray emitter may be incident to the camera unit 270.

Figure 3:
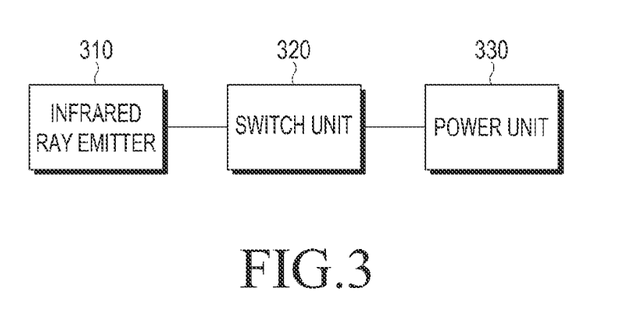
FIG. 3 is a configuration diagram of a pen according to an embodiment of the present invention.

FIG. 3 is a configuration diagram of the pen 300 according to an embodiment of the present invention. Referring to FIG. 3, the pen 300 may include an infrared ray emitter 310, a switch unit 320, and a power unit 330. When the pen 300 touches the area of the image data projected onto the floor, the infrared ray emitter 310 and the power unit 330 are connected by the switch unit 320, and the infrared ray emitter 310 receives power from the power unit 330 to emit the light. The infrared ray emitter 310 includes, for example, an infrared ray Light-Emitting Diode (LED). When the pen 300 touches the area of the image data projected onto the floor, a coordinate value corresponding to a position touched by the pen may be greater than or equal to the first threshold due to the incidence of the emitted light, in the image data photographed by the infrared ray camera 270.

Accordingly, the portable projector 200 calculates each coordinate value of the projected image data photographed by the camera unit 270, and determines, when there is a coordinate value greater than the first threshold, the corresponding coordinate value as an input coordinate value of the pen 300.

When there is a coordinate value less than or equal to the first threshold and greater than the second threshold among the coordinate values of the projected image data photographed by the camera unit 270, the corresponding coordinate value is determined as an input coordinate value of the finger 400. In addition, the portable projector 200 transmits the input coordinate value and the image data update request signal to the external terminal 100, receives the updated image data from the external terminal 100, and then projects the image data.

Figure 4:
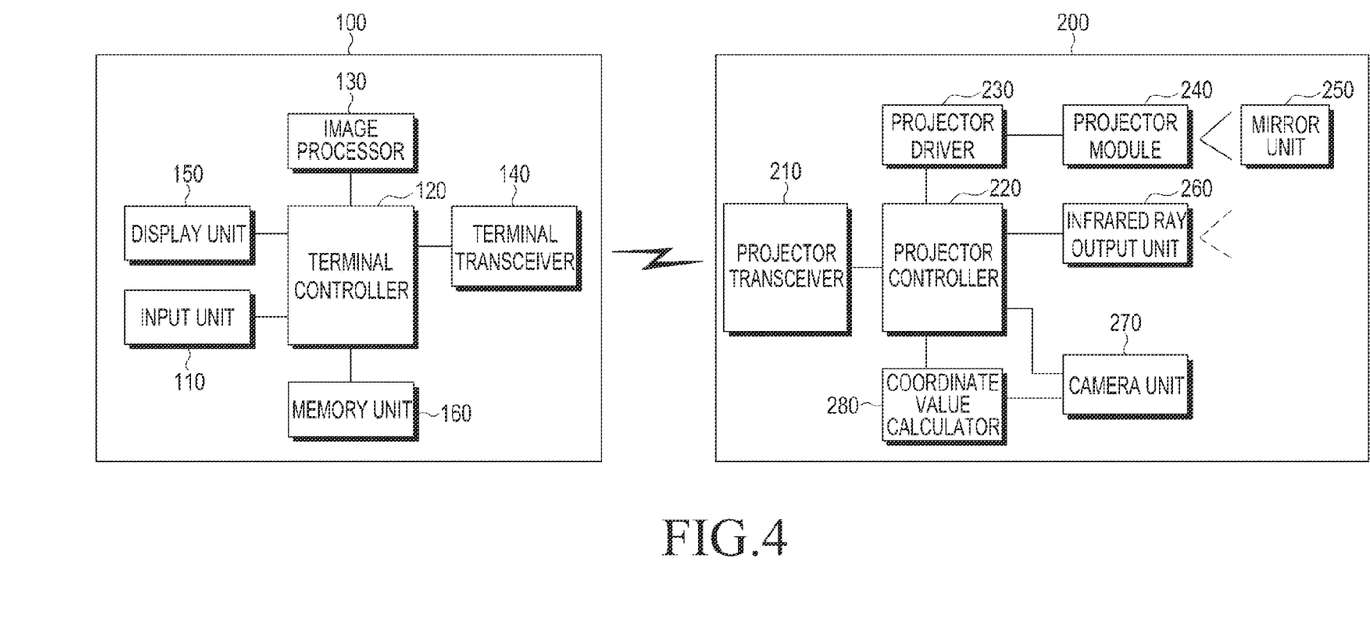
FIG. 4 is a configuration diagram of an external terminal and a portable projector according to an embodiment of the present invention.

FIG. 4 is a configuration diagram of the external terminal 100 and the portable projector 200 according to an embodiment of the present invention. Referring to FIG. 4, the external terminal 100 may be a mobile terminal such as a smart phone, and includes an input unit 110, a terminal controller 120, an image processor 130, a terminal transceiver 140, a display unit 150, and a memory unit 160.

The input unit 110 inputs various numbers, characters and symbols and may be implemented by a keypad or a touch screen including a combination of a plurality of keys for inputting various user commands. The input unit 110 transfers a user input such as an image projection request input by the user to the terminal controller 120 according to an embodiment of the present invention.

The terminal controller 120 performs general control operations for the external terminal 100, such as a control required for transmitting image data to the portable projector 200 and a control required for updating the image data as an input coordinate value and an image data update request signal are received from the portable projector.

The image processor 130 updates the image data by using the input coordinate value according to a control of the terminal controller 120. For example, the image processor 130 performs image processing for the image data in a position corresponding to the input coordinate value among the existing image data and updates the image data to image-processed image data.

The terminal transceiver 140 performs communication with the portable projector 200 according to a control of the terminal controller 120, transmits the image data to the portable projector 200, and receives the input coordinate value and the image data update request signal from the portable projector 200. When the image data is updated, the terminal transceiver 140 transmits the updated image data to the portable projector 200.

The display unit 150 may be implemented by a Liquid Crystal Display (LCD) or an Organic Electroluminescence Display (OLED), for example, and displays a screen showing an operation or a state of the external terminal 100 according to a control of the controller 120.

The memory unit 160 may be implemented by a nonvolatile memory such as a flash memory or a hard disk, and stores data or a program required for the operation of the external terminal 100. Particularly, the memory unit 160 stores image data such as a photo, a video, and an image.

The portable projector 200 which receives the image data from the external terminal 100 and projects the image data onto an external screen such as a floor may include a projector transceiver 210, a projector controller 220, a projector driver 230, the projector module 240, the mirror unit 250, the infrared output unit 260, the camera unit 270, and a coordinate value calculator 280.

The projector transceiver 210 performs communication with the external terminal 100. For example, the projector transceiver 210 receives the image data from the external terminal 100. When there is an input by at least one of the pen 300 and/or the finger 400, the projector transceiver 210 transmits an input coordinate value by the pen 300 and/or the finger 400 and an image data update request signal to the external terminal 100.

The projector controller 220 performs a general control operation of the portable projector 200. For example, when the image data is received from the external terminal 100, the projector controller 220 performs a control required for projecting the received image data. The projector controller 220 receives each coordinate value calculated by the coordinate value calculator 280. When there is a coordinate value greater than a first threshold (for example, when photographed image data is 8 bit YUV, a Y threshold corresponds to a 255 level), the projector controller 220 determines the corresponding coordinate value as an input coordinate value of the pen 300.

When there is a coordinate value less than or equal to the first threshold and greater than a second threshold (for example, when photographed image data is 8 bit YUV, a Y threshold corresponds to a 128 level) among coordinate values of the projected image data calculated by the coordinate value calculator 280, the projector controller 220 determines the corresponding coordinate value as an input coordinate value of the finger 400. The projector controller 220 controls such that the input coordinate value and the image data update request signal are transmitted to the external terminal 100, and the updated image data is received from the external terminal 100 and is then projected.

The projector driver 230 controls a size of a projection screen and brightness of the projector screen onto which the image data is to be projected according to a control of the projector controller 220, and drives the projector module 240 to project the image data.

The projector module 240 is driven by the projector driver 230 to project the image data according to the projection screen size and the projection screen brightness controlled by the projector driver 230

The mirror unit 250 may be implemented by a convex mirror designed to have a particular curvature, and reflects the image data projected from the projector module 240 with the particular curvature to project the image data onto the floor. Preferably, the curvature allows the image data projected from the projector module 240 to be projected onto the floor without distortion.

The infrared ray output unit 260 may be implemented by an Infrared Ray emitting diode (IR emitter), and outputs an infrared ray to an area corresponding to an image data projection screen.

The camera unit 270 may be implemented by an infrared ray camera, and generally photographs the projected image data area in 30 frames per second.

The coordinate value calculator 280 calculates each coordinate value of the projected image data photographed by the camera unit 270. For example, the coordinate value calculator 280 calculates a YUV value corresponding to each coordinate of the photographed projected image data and transfers the calculated YUV value to the projector controller 220.

The portable projector 200 configured as described above according to an embodiment of the present invention enables a simple projection onto the floor by reflecting the projected image data onto the floor by using the mirror, and simultaneously supports inputs by the pen 300 and the finger 400, so that the user may perform the input by using a desired one of the pen 300 and the finger 400 during the image projection.

Figure 5:
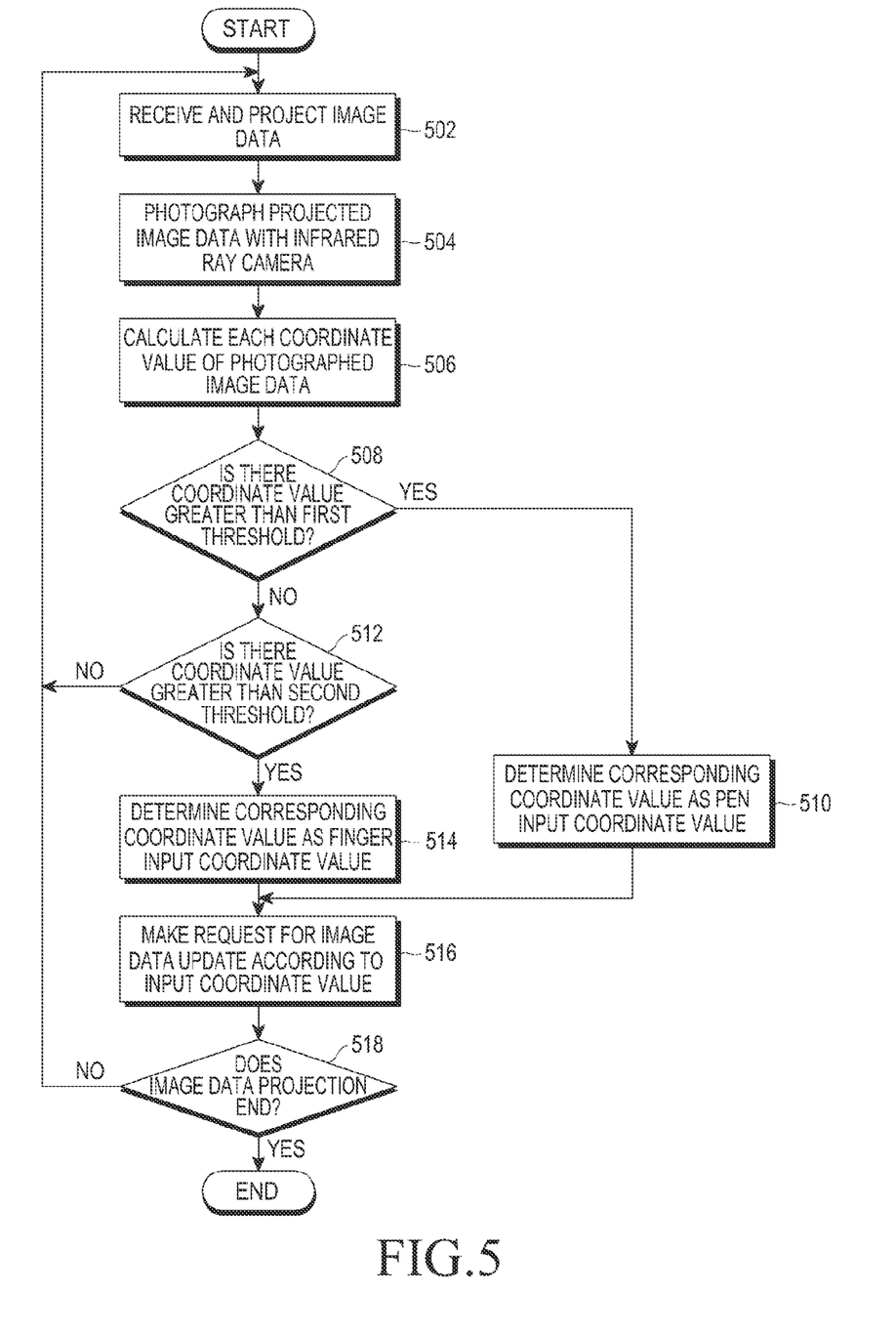
FIG. 5 illustrates an image projecting method of a portable projector according to a first embodiment of the present invention.

FIG. 5 is a flowchart of an image data projecting method of the portable projector 200 according to a first embodiment of the present invention. Referring to FIG. 5, the portable projector 200 receives image data from the external terminal 100 and projects the received image data onto an external screen such as a floor by the mirror unit 250 in step 502.

The portable projector 200 photographs the projected image data through the camera unit 270 in step 504, and calculates each coordinate value of the photographed image data through the coordinate value calculator 280 in step 506.

When an image data area projected onto the floor is touched by the finger 400, an infrared ray flat light is reflected by the finger 400 and the reflected light is incident to the camera unit 270, so that a coordinate value corresponding to a position touched by the finger 400 may be greater than or equal to a second threshold due to the incidence of the reflected light, in the photographed image data. When the image data area projected onto the floor is touched by the pen 300, a light emitted by an emission of the infrared ray emitter 310 of the pen 300 is incident to the camera unit 270, so that a coordinate value corresponding to a position touch by the pen 300 may be greater than or equal to a first threshold due to the incidence of the emitted light.

Accordingly, the portable projector 200 determines whether there is a coordinate value greater than the first threshold among coordinate values of the photographed image data in step 508. The first threshold is a reference value which determines an input by the pen 300. For example, when the photographed image data is 8 bit YUV, a Y threshold may be a 255 level.

When there is the coordinate value greater than the first threshold, the portable projector 200 determines the corresponding coordinate value as an input coordinate value of the pen in step 510.

The portable projector 200 determines whether there is a coordinate value less than or equal to the first threshold and greater than the second threshold among the coordinate values of the photographed image data in step 512. The second threshold is a reference value which determines an input by the finger 400. For example, when the photographed image data is 8 bit YUV, the Y threshold may be a 128 level.

When there is the coordinate value less than or equal to the first threshold and greater than the second threshold, the portable projector 200 determines the corresponding coordinate value as an input coordinate value of the finger 400 in step 514.

The portable projector 200 requests an image data update according to the input coordinate value by the external terminal 100 in step 516, and determines whether the image data projection ends in step 518. When the image data projection does not end, the portable projector 200 returns to step 502 where the updated image data from the external terminal 100 is received and projected.

According to the first embodiment of the present invention, when the user continuously performs the input of the pen 300, an infrared ray flat light is continuously output by the infrared ray output unit 260, so that a reflected light of the infrared ray flat light by a palm touch generated when the input of the pen 300 is performed may be photographed by the camera, together with the light emitted by the pen 300. The photographed reflected light may act as noise in determining the input coordinate value, and thus generate an error in calculating the input coordinate value.

Accordingly, in a second embodiment of the present invention, the infrared ray output unit 260 outputs the infrared ray flat light when there is no pen 300 input, and does not output the infrared ray flat light when there is no pen 300 input, so that when the user continuously performs the pen 300 input, the reflected light by the palm touch is not generated.

Figure 6:
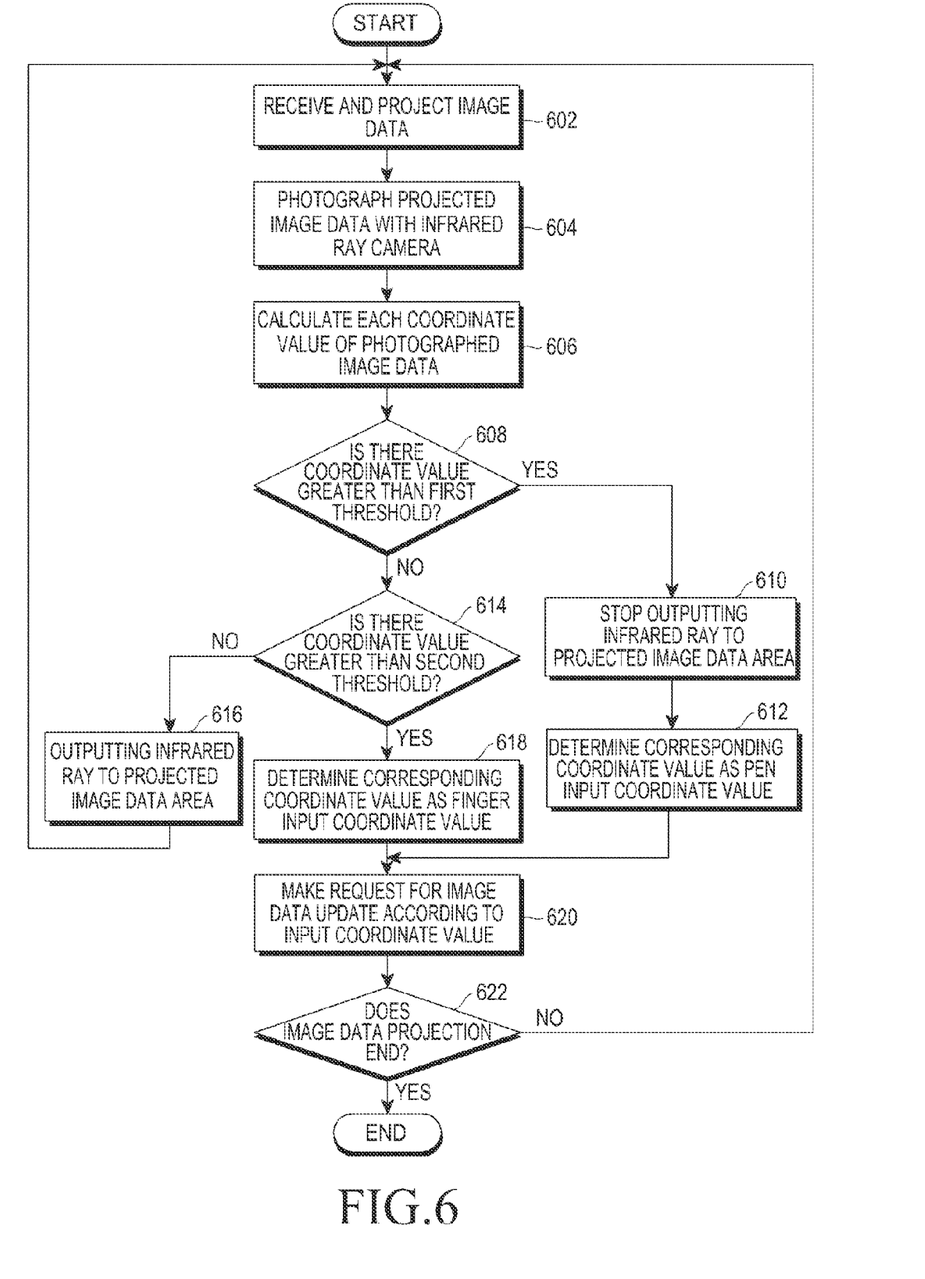
FIG. 6 illustrates an image projecting method of a portable projector according to a second embodiment of the present invention.

FIG. 6 is a flowchart of the image data projecting method of the portable projector 200 according to the second embodiment of the present invention. Referring to FIG. 6, the portable projector 200 receives image data from the external terminal 100 and projects, by the mirror unit 250, the received image data onto an external screen such as a floor in step 602.

The portable projector 200 photographs the projected image data through the camera unit 270 in step 604 The, and calculates each coordinate value of the photographed image data through the coordinate value calculator 280 in step 606.

When an image data area projected onto the floor is touched by the finger 400, an infrared ray flat light is reflected by the finger 400 and the reflected light is incident to the camera unit 270, so that a coordinate value corresponding to a position touched by the finger 400 may be greater than or equal to a second threshold due to the incidence of the reflected light, in the photographed image data. When the image data area projected onto the floor is touched by the pen 300, a light emitted by an emission of the infrared ray emitter 310 of the pen 300 is incident to the camera unit 270, so that a coordinate value corresponding to a position touch by the pen 300 may be greater than or equal to a first threshold due to the incidence of the emitted light.

Accordingly, the portable projector 200 determines whether there is a coordinate value greater than the first threshold among coordinate values of the photographed image data in step 608. The first threshold is a reference value which determines an input of the pen 300. For example, when the photographed image data is 8 bit YUV, a Y threshold may be a 255 level.

When there is the coordinate value greater than the first threshold, the portable projector 200 turns off the infrared ray output unit 260 to stop outputting the infrared ray flat light by the infrared ray output unit 260 in step 610.

The portable projector 200 determines the coordinate value greater than the first threshold as an input coordinate value of the pen in step 612.

The portable projector 200 determines whether there is a coordinate value less than or equal to the first threshold and greater than the second threshold among the coordinate values of the photographed image data in step 614. The second threshold is a reference value which determines an input by the finger 400. For example, when the photographed image data is 8 bit YUV, the Y threshold may be a 128 level.

When there is the coordinate value less than or equal to the first threshold and greater than the second threshold, the portable projector 200 turns on the infrared ray output unit 260 to restart outputting the infrared ray flat light by the infrared ray output unit 260 in step 616 and returns to step 602.

When there is the coordinate value less than or equal to the first threshold and greater than the second threshold, the portable projector 200 determines the coordinate value less than or equal to the threshold and greater than the second threshold as an input coordinate value of the finger 400 in step 618.

The portable projector 200 requests an image data update according to the input coordinate value by the external terminal 100 in step 620, and determines whether the image data projection ends in step 622. When the image data projection does not end, the portable projector 200 returns to step 602, where it receives the image data from the external terminal 100 and projects the image data.

According to the second embodiment of the present invention, when one of the coordinate values of the photographed image data is greater than the first threshold and is thus determined as the pen input, the reflected light by the input of the finger 300 may be effectively blocked by turning off a power supply of the infrared ray output unit 260. Accordingly, since only the infrared ray light emitted from the pen 300 is detected by the infrared ray camera 270, a noise light generated by the palm touch during the input of the pen 300 may be effectively removed. When there is no pen 300 input, the input of the finger 400 may be redetected by turning on the infrared ray output unit 260.

Although it has been described that the portable projector 200 receives the image data from the external terminal 200 and projects the received image data onto the floor by example, when the portable projector 200 projects the stored image data onto the floor and there is at least one of the inputs by the pen 300 and the finger 400 in the projected image data area, the portable projector 200 may update the image data by itself and project the updated image data.

According to the present invention, the portable projector manufacturing cost is reduced since it is not required to include a separate hardware component for controlling a projection angle by enabling a simple projection onto the floor through a method of reflecting the image data projected from the portable projector by using the mirror.

The present invention provides the portable projector which can discriminate between and simultaneously support the pen input and the finger input, and the image data projecting method of the portable projector, so that the user can conveniently perform the input by using a desired one of the pen and the finger during the image projection.

Although embodiments have been described in the above description of the present invention, various modifications may be made without departing from the scope of the present invention. For example, it has been described that the image data is projected onto the floor as an example in some embodiments, but the image data may be projected onto another external screen such as a wall by controlling a curvature of the mirror unit 250. In addition, it has been described that the first threshold and the second threshold are YUV levels in the description of the present invention, but the first threshold and the second threshold may be determined as other values. Accordingly, the scope of the present invention should be defined by the claims and equivalents thereof rather than the aforementioned embodiments.

What is claimed is:

1. A portable projector comprising:
a projector module for projecting image data;
an infrared ray output unit which outputs an infrared ray to a projected image data area;
an infrared ray camera which receives infrared light from the projected image data area; and
a controller which determines whether there is a pen input or a finger input based on a value of the infrared light of each coordinate corresponding to the projected image data area.

2. The portable projector of claim 1, further comprising a mirror unit which reflects the image data projected from the projector module at an angle according to a curvature to project the image data.

3. The portable projector of claim 2, wherein the curvature enables the projected image data to be reflected onto a floor.

4. The portable projector of claim 1, wherein the controller determines, when there is a coordinate value that is greater than a first threshold among values of the infrared light of the each coordinate, the corresponding value of the infrared light as a value of the infrared light of a pen input coordinate, and determines, when there is a coordinate value that is less than or equal to the first threshold and greater than a second threshold, the corresponding value of the infrared light as a value of the infrared light of a finger input coordinate.

5. The portable projector of claim 1, further comprising a projector transceiver which receives the image data from an external terminal and transmits a value of the infrared light of an input coordinate according to the pen input or the finger input and an image data update request to the external terminal according to a control of the controller when there is the input by the one of the pen and the finger.

6. The portable projector of claim 1, wherein the controller further performs a control for updating the image data by using a value of the infrared light of an input coordinate corresponding to the determining whether there is the pen input or the finger input, when the input is determined.

7. A method of projecting image data by a portable projector, the method comprising:
projecting image data and outputting an infrared ray to a projected image data area;
receiving infrared light from the projected image data area; and
determining whether there is a pen input or a finger input based on a value of the infrared light of each coordinate corresponding to the projected image data area.

8. The method of claim 7, further comprising:
updating the image data by using a value of the infrared light of an input coordinate corresponding to the determining whether there is the pen input or the finger input, when the input is determined; and
projecting the updated image data.

9. The method of claim 7, further comprising:
transmitting a value of the infrared light of an input coordinate according to the pen input or the finger input and an image data update request signal to an external terminal; and
receiving the updated image data from the external terminal.

10. The method of claim 7, wherein determining whether there is the pen or the finger input comprises determining, when there is a value of the infrared light that is greater than a first threshold among the values of the infrared light of each of the coordinates, the corresponding value of the infrared light as a value of the infrared light of a pen input coordinate, and determining, when there is a value of the infrared light that is less than or equal to the first threshold and greater than a second threshold, the corresponding value of the infrared light as a value of the infrared light of a finger input coordinate.

11. The method of claim 10, further comprising stopping output of the infrared ray to the projected image data area when the input coordinate value is determined as the value of the infrared light of the pen input coordinate.

12. The method of claim 11, further comprising, after stopping output of the infrared ray, restarting output of the infrared ray to the projected image data area when there is no value of the infrared light of a coordinate that is less than or equal to the first threshold and greater than the second threshold.

* * * * *